United States Patent [19]
Jensen

[11] Patent Number: 5,878,850
[45] Date of Patent: Mar. 9, 1999

[54] BI-DIRECTIONAL PRESSURE CONTROL VALVED DAMPER

[75] Inventor: Eric Lee Jensen, Dayton, Ohio

[73] Assignee: General Motors Corporation, Detroit, Mich.

[21] Appl. No.: 767,089

[22] Filed: Dec. 16, 1996

[51] Int. Cl.$^6$ ................................................ F16F 15/03
[52] U.S. Cl. ............... 188/267; 188/322.15; 188/282.4; 188/282.5
[58] Field of Search ............................. 188/322.15, 317, 188/267, 282.2, 282.4, 282.5, 282.8, 313, 299.1; 280/707

[56] References Cited

U.S. PATENT DOCUMENTS

| | | | |
|---|---|---|---|
| 4,902,034 | 2/1990 | Maguran et al. | 280/707 |
| 4,923,038 | 5/1990 | Lizell | 188/322.15 X |
| 4,947,707 | 8/1990 | Neumann et al. | 188/322.15 X |
| 5,069,420 | 12/1991 | Stobbs et al. | 251/30.02 |
| 5,129,490 | 7/1992 | Kuehle et al. | 188/299 |
| 5,163,538 | 11/1992 | Derr et al. | 188/318 |
| 5,163,706 | 11/1992 | Maguran, Jr. et al. | 280/707 |
| 5,282,645 | 2/1994 | Spakowski et al. | 280/707 |
| 5,560,454 | 10/1996 | Jensen et al. | 188/299 |

*Primary Examiner*—Lee W. Young
*Attorney, Agent, or Firm*—Jeffrey A. Sedlar

[57] ABSTRACT

A damper with continuously variable rates in both extension and compression operation is provided. The damper includes a single tube carrying a piston having at least one pressure chamber and separating the tube into extension and compression chambers. A bi-directional control valve is carried by the piston. The control valve includes a first annular disc carrying a seal and separating the pressure chamber from the extension chamber. A second annular disc carrying a seal separates the pressure chamber from the compression chamber. The discs are variably deflectable under fluid force to provide an opening through the piston. A pair of armatures control the fluid pressure in the pressure chamber to change the deflective characteristics of the discs by varying a backpressure in the pressure chamber. A coil is positioned near the first and second armatures and is operable to draw both the first and the second armatures to close the passages.

7 Claims, 4 Drawing Sheets

BI-DIRECTIONAL PRESSURE CONTROL VALVED DAMPER

TECHNICAL FIELD

The present invention relates to a bi-directional pressure control valved damper and more particularly, to a monotube suspension damper that carries a bi-directional pressure control valve in the piston to provide real time control of damping forces in both compression and rebound directions through the use of a single flow path for both passive and controlled operation.

BACKGROUND OF THE INVENTION

Conventional vehicle suspension dampers typically consist of direct double-acting telescopic hydraulic passive devices. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the medium for dissipating energy. As the damper is cycled, a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving. As the piston moves an additional amount of oil substantially equal to the volume of the piston rod entering or exiting the cylinder tube is forced through the piston valving or through a valve on the base of the cylinder tube in combination with the piston valving in compensation.

As oil is forced to flow through the orifices in the piston valve and/or the base valve the pressure drop effects an energy conversion and the oil is heated. Through this mechanism dampers dissipate energy stored by the vehicle's suspension springs. The extent to which the oil is heated and consequently, the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide selected vehicle performance characteristics. Because passive dampers provide a set damping force they are generally somewhat of a compromise in providing optimum damping performance over a wide range of operating conditions.

The concept of dampers with an electrically controlled damping rate has been developed in the art wherein an algorithm is used to provide a control mechanism for a means of varying the damping force provided by a damper. This is typically achieved by varying the valving orifices in response to various sensors which are used to detect current real world vehicle operating conditions. Such dampers adjust the damping force in response to the control mechanism so that various performance characteristics can be provided by an individual damper. A controllable orifice however, provides less than ideal levels of control, particularly at low flow rates.

Electrically controlled hydraulic dampers for vehicle suspensions have, in principle, been known in the art for some time. However, their actual wide-spread application and use has been somewhat of a recent phenomenon. A known type of adjustable damper which includes a control valve positioned near the piston carries components of the control valve within the piston rod. This necessitates a piston rod of a relatively large diameter. Additional volume required to accommodate the displacement resulting from a large diameter rod unpreferably increases the overall size of the damper and detracts from the active length of the assembly. Another type of known adjustable damper carries the control valve outside the cylinder tube. This type of design necessitates consideration of the externally carried valve when packaging the damper within the suspension system. Still other types of adjustable dampers vary the size of an orifice to control the pressure drop through a valve to change the performance provided by the damper.

A damper incorporating an electronically controlled flow regulation valve into the piston is disclosed in U.S. Pat. No. 5,560,454 which issued Oct. 1, 1996. That patent describes a damper with a regulating valve providing a continuously variable amount of damping by regulating extension fluid flow during damper extension only. Additionally, a separate bi-directional passive damping valve provides damping during both extension and compression travel of the damper. The regulation valve does not affect the amount of damping provided during damper compression.

SUMMARY OF THE INVENTION

According to an aspect of the present invention a damper with continuously variable rates in both extension and compression operation is provided. The damper includes a single tube carrying a piston having at least one pressure chamber and separating the tube into extension and compression chambers. The piston is movable in an extension direction and a compression direction in response to suspension operation of an associated vehicle. A bi-directional control valve is carried by the piston. The control valve includes a first annular disc carrying a seal and separating a pressure chamber from the extension chamber. The first disc is variably deflectable under fluid force to provide an opening between the pressure chamber and the extension chamber. A passage extends around the first disc between the pressure chamber and the extension chamber. A first movable armature is positioned in the first passage. A second annular disc carrying a seal separates the pressure chamber from the compression chamber. The second disc is variably deflectable under fluid force to provide an opening between the pressure chamber and the compression chamber. Another passage extends around the second disc between the pressure chamber and the compression chamber. A second movable armature is positioned in the second passage. A coil is positioned near the first and second armatures and is operable to draw both the first and the second armatures to close the passages.

According to a preferred embodiment of the present invention, when the piston moves in an extension direction, fluid in the damper is moved to flow through the piston from the extension chamber to the compression chamber. The second disc prevents fluid flow from the pressure chamber to the compression chamber. The first disc provides variably controllable fluid flow from the extension chamber to the compression chamber. The flow rate is controlled by the amount that the first disc deflects. The deflective characteristic of the first disc is controlled by controlling fluid pressure in the pressure chamber. This is possible since the first disc must deflect into the pressure chamber to provide an opening through the piston between the extension chamber and the compression chamber.

The amount of fluid pressure in the pressure chamber is controlled by the second armature. During extension operation of the damper, the first armature is forced against the pole piece by fluid force. The second armature is forced away from the pole piece by the fluid force. An orifice in the first armature allows a metered amount of fluid flow though the passage from the extension chamber to the pressure chamber. The metered fluid flow is expelled to the compression chamber when the coil is not energized and the second armature is not electromagnetically biased toward the pole piece. When the fluid is expelled, the pressure chamber is not "charged" by the metered fluid flow through the first armature. Therefore, the damping characteristic of the piston is determined solely by the passive deflective characteristic built into the first disc.

To increase the resistance to deflection of the first disc, the coil is energized to draw the second armature toward the pole piece. A controlled rate of current is applied to the coil to achieve a desired level of damping. As the ability to expel the metered fluid to the compression chamber is restricted, fluid pressure builds in the pressure chamber as a result of inflow through the passage. The increase in fluid pressure increases the resistance to deflection of the first disc and results in a firmer damping characteristic for the damper. Therefore, rather than varying the size of an orifice to change the damping rate without regard to the actual pressure gradients in the damper, damping force is adjusted by a backpressure created by the pressure developed within the pumping chamber of the damper itself.

In a manner similar to the operation in extension, when the piston moves in a compression direction, fluid in the damper is moved to flow through the piston from the compression chamber to the extension chamber. The first disc prevents fluid flow from the pressure chamber to the extension chamber. The second disc provides variably controllable fluid flow from the compression chamber to the extension chamber. The flow rate is controlled by the amount that the second disc deflects. The deflective characteristic of the second disc is controlled by controlling fluid pressure in the pressure chamber. This is possible since the second disc must deflect into the pressure chamber to provide an opening through the piston between the compression chamber and the extension chamber.

The amount of fluid pressure in the pressure chamber is controlled by the first armature. During compression operation of the damper, the second armature is forced against tie pole piece by fluid force. The first armature is forced away from the pole piece by the fluid force. An orifice in the second armature allows a metered amount of fluid flow though the passage from the compression chamber to the pressure chamber. The metered fluid flow is expelled to the extension chamber when the coil is not energized and the first armature is not electromagnetically biased toward the pole piece. When the fluid is expelled, the pressure chamber is not charged by the metered fluid flow through the second armature. Therefore, the damping characteristic of the piston is determined solely by the passive deflective characteristic built into the second disc.

To increase the resistance to deflection of the second disc, the coil is energized to draw the first armature toward the pole piece. A controlled rate of current is applied to the coil to achieve a desired level of damping. As the ability to expel the metered fluid to the extension chamber is restricted, fluid pressure builds in the pressure chamber as a result of inflow through the passage. The increase in fluid pressure increases the resistance to deflection of the second disc and results in a firmer damping characteristic for the damper. By controlling the electric current supplied to the coil, the resulting electromagnetic force is varied and the extent of interruption of fluid expulsion from the pressure chamber is controlled. This varies the backpressure in the pressure chamber and varies the amount of energy dissipated in deflecting the disc.

DESCRIPTION OF THE PREFERRED EMBODIMENT

Figure 1:
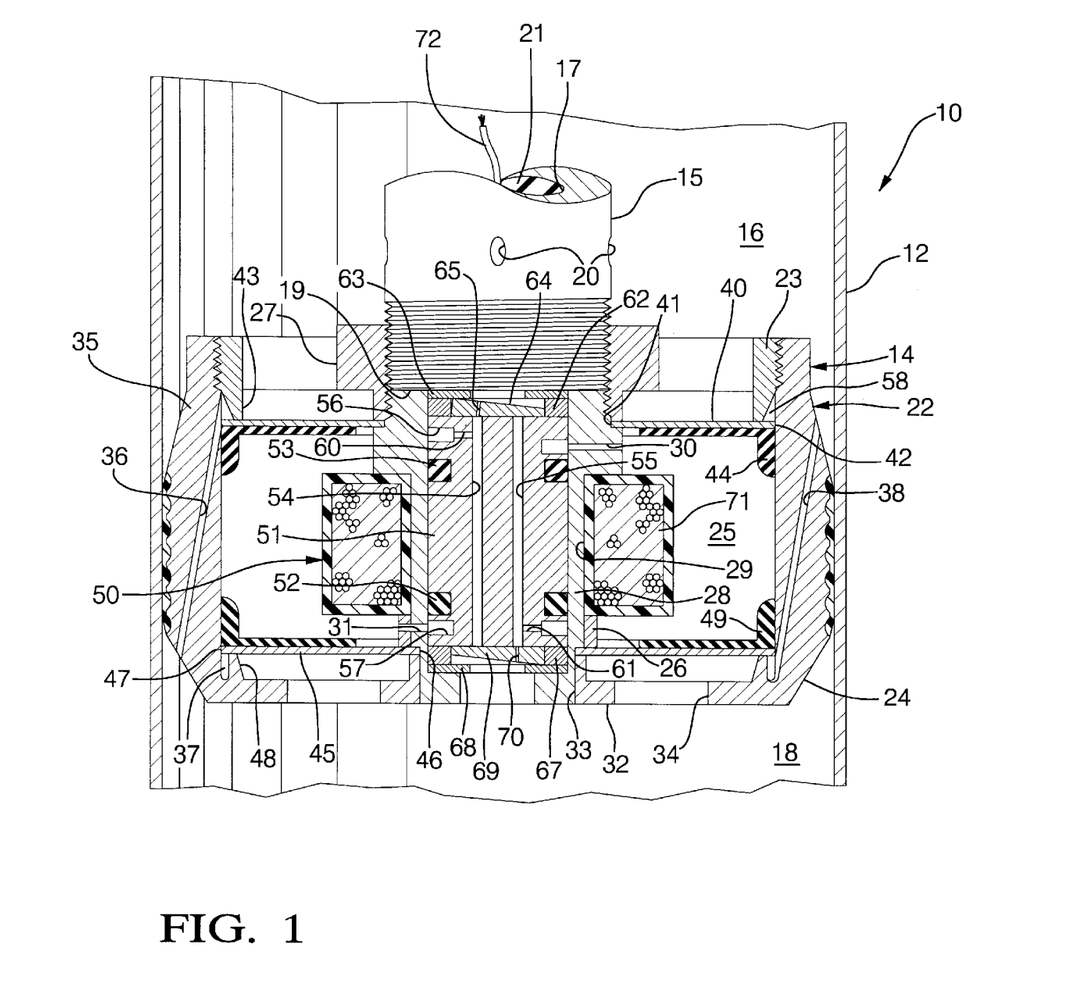
FIG. 1 is a fragmentary cross sectional illustration of a vehicle suspension damper.

Referring to the drawings, illustrated in FIG. 1 is that part of a monotube damper 10 which is most pertinent to the present invention. Damper 10 includes a single cylinder tube 12 which generally carries a supply of fluid (not illustrated), that serves as a damping medium providing damping control between sprung and unsprung masses (not illustrated), of an associated vehicle. Slidably carried within cylinder tube 12 is piston assembly 14 which separates the cylinder tube into extension chamber 16 and compression chamber 18 and reciprocates therethrough. Securely connected to piston assembly 14 is piston rod 15 which extends through extension chamber 16 of cylinder tube 12. Piston rod 15 includes an axial opening 17 that opens through the end 19. The axial opening 17 is intersected by a plurality of transverse openings 20 which open to the extension chamber 16. A seal 21 is positioned in the axial opening 17 on the opposite side of the transverse openings 20 from the piston assembly 14.

The piston assembly 14 includes a body 22 formed of two securely mating elements 23 and 24 which come together to form a single central pressure chamber 25 that is annular in shape. The body element 23 is formed as an annular plate 26 which is threaded onto the piston rod 15 and which includes a plurality of main openings 27 that extend between the extension chamber 16 and the pressure chamber 25. The body element 23 receives a cylindrical extension 28 within the same threaded opening as the rod 15. The cylindrical extension 28 includes a central opening 29 that opens to the compression chamber 18 and to the axial opening 17 of the piston rod 15 at the end 19. Openings 30 and 31 extend through the cylindrical extension 28 between the central opening 29 and the pressure chamber 25.

The body element 24 includes an annular plate 32 with an opening 33 that is securely received over the cylindrical extension 28. A plurality of main openings 34 extend through the annular plate 32 between the compression chamber 18 and the pressure chamber 25. A cylindrical extension 35 is formed together as one piece with the annular plate 32 and is securely engaged with the annular plate 26 of the body element 23. The cylindrical extension 35 includes a number of openings 36 distributed around its perimeter and extending between the compression chamber 18 and the pressure chamber 25. The cylindrical extension 35 carries a band of low friction material 39 that engages the tube 12 and sealingly separates the extension chamber 16 from the compression chamber 18.

The cylindrical extension 35 also includes a number of openings 38 distributed around its perimeter and extending between the extension chamber 16 and the annular cavity 37 formed by the body element 24 between the cylindrical extension 35 and the annular rib 48. A deflectable annular damping disc 45 is captured at its inner perimeter 46 by the cylindrical extension 28 of body element 23 and is supported near its outer perimeter 47 by annular rib 48 of body element 24. The disc 45 is self-biasing against the annular rib 48 to close the off openings 34 and provide fluid separation between the compression chamber 18 and the pressure chamber 25. The disc 45 carries an elastomeric seal 49 that bears against the cylindrical extension 35 of body element 24 and normally closes the openings 38 off from both the compression chamber 18 and the pressure chamber 25.

The cylindrical extension 35 also includes a number of openings 36 distributed around its perimeter and extending between the compression chamber 18 and the annular cavity 58 formed by the body 22 between the cylindrical extension 35 and the annular rib 43. A deflectable annular damping disc 40 is captured at its inner perimeter 41 between the body element 23 and the cylindrical extension 28, and is supported near its outer perimeter 42 by annular rib 43 of the body element 23. The disc 40 is self-biasing against the annular rib 43 to normally provide closure of the opening 27 separating the pressure chamber 25 from the extension chamber 16. The disc 40 carries an elastomeric seal 44 that bears against the cylindrical extension 35 and sealingly closes the openings 36 off from both the extension chamber 16 and the pressure chamber 25.

A solenoid actuator assembly 50 is carried by the cylindrical extension 28. The actuator assembly 50 includes a stationary pole piece 51 that is positioned within the central opening 29 and carries a pair of annular seals 52 and 53. The pole piece 51 includes longitudinal passages 54 and 55. The pole piece 51 also includes annular channels 56 and 57. A cross opening 60 extends between the annular channel 56 and the longitudinal passage 54. Similarly, a cross opening 61 extends between the annular channel 57 and the longitudinal passage 55. The annular channel 56 registers with the opening 30 through the cylindrical extension 28 so that the longitudinal passage 54 is continuously open to the pressure chamber 25. Similarly, the annular channel 57 registers with the opening 31 through the cylindrical extension 28 and spacer 26 so that the longitudinal passage 55 is continuously open to the pressure chamber 25.

The actuator assembly 50 also includes an annular nonmagnetic spacer 62 and an annular plate 63 that are positioned between the pole piece 51 and the piston rod 15 within the central opening 29. A wedge armature 64 is positioned within the nonmagnetic spacer 62 between the plate 63 and the pole piece 51. The wedge armature 64 includes a metering orifice 65 that registers with the longitudinal passage 54. Actuator assembly 50 includes another annular nonmagnetic spacer 67 and an annular plate 68 that are captured by the body element 24 within the central opening 29 and against the pole piece 51. A wedge armature 69 is positioned within the nonmagnetic spacer 67 between the plate 68 and the pole piece 51. Wedge armature 69 includes a metering orifice 70 that registers with the longitudinal passage 55.

A coil 71 comprising a plurality of turns of wire wound on a bobbin is positioned over the cylindrical extension 28 and about the pole piece 51. The coil 71 is supplied with controlled current through the lead 72 that extends through the axial opening 17 as a first conductor, and the piston rod 15 as a second conductor. When the coil 71 is energized, both armatures 64 and 69 are drawn against the pole piece 51 as shown in FIG. 1.

Figure 2:
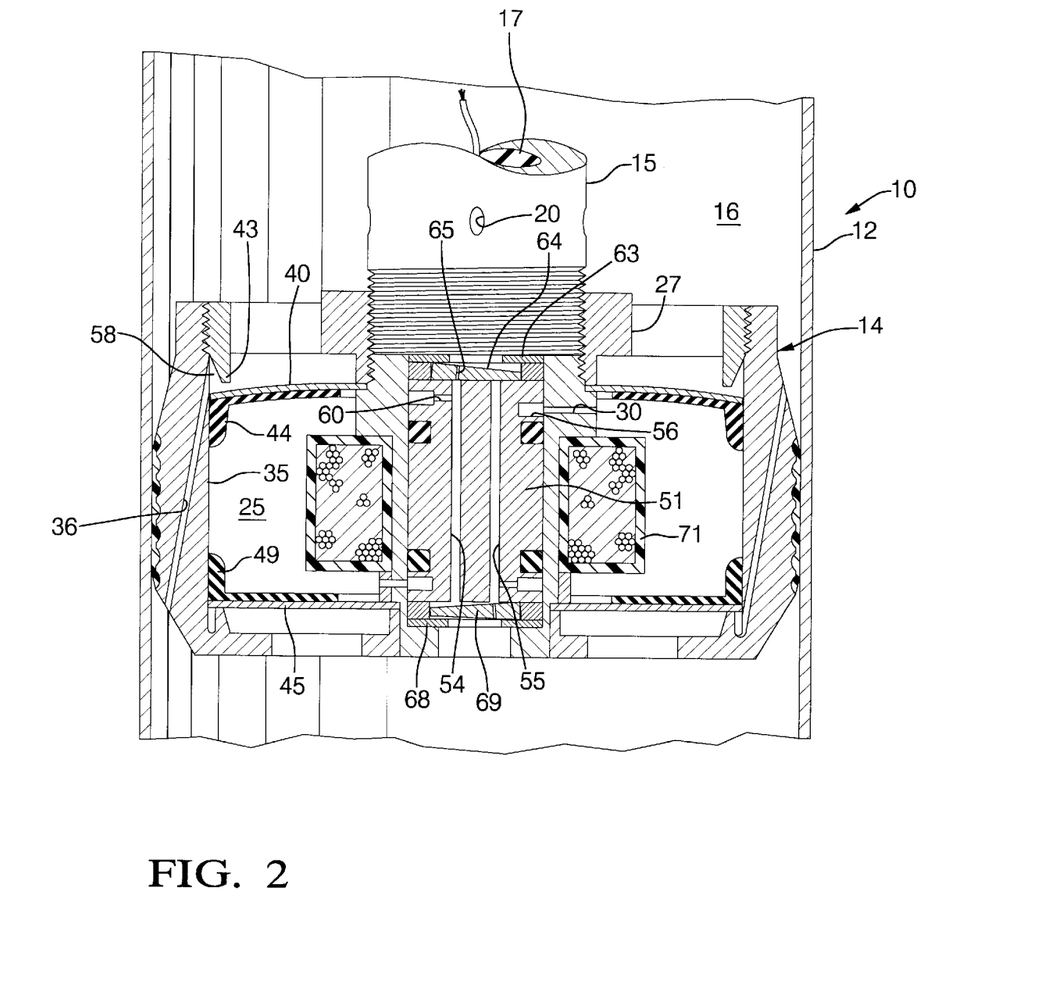
FIG. 2 is a fragmentary cross section illustration of the damper of FIG. 1 shown in extension operation.

When the piston assembly 14 moves in an extension direction as is represented in Figure, 2 fluid is induced to flow from the extension chamber 16 to the compression chamber 18. Fluid force at the openings 27 causes the disc 40 and associated seal 44 to deflect downward creating an opening that permits flow from the openings 27 to the annular cavity 58. Fluid flow from the extension chamber 16 to the compression chamber 18 is established through openings 27, between disc 40 and annular rib 43, through annular cavity 58 an openings 36. Fluid flow into the pressure chamber 25 along the cylindrical extension 35 is inhibited by seal 44 in combination with the fluid pressure in pressure chamber 25. Fluid flow from pressure chamber 25 to compression chamber 18 is inhibited during extension operation by disc 45 and seal 49.

Fluid force established in extension chamber 16 as a pumping chamber is also transmitted through the openings 20 and the axial opening 17 of piston rod 15, on through the plate 63 forcing the wedge armature 64 against the pole piece 51. The wedge armature 64 closes the longitudinal passage 55. Fluid flow and pressure transmission is permitted through the metering orifice 65 of the wedge armature 64 and into the longitudinal passage 54. When the coil 71 is not energized, fluid in the longitudinal passage 54 is expelled past the wedge armature 69 and through the plate 68 into the compression chamber 18. Therefore, the damping characteristics of the damper 10 is determined solely by the mechanical deflective characteristics of the disc 40 and the flow of fluid there-past.

When the coil 71 is energized, the wedge armature 68 is drawn against the stop 51 as shown in FIG. 1. This prevents fluid from being expelled from the longitudinal passage 54 past the armature 69. Therefore, fluid flow and pressure transmission through the metering orifice 65 is discharged through the opening 60, annular channel 56 and opening 30 to the pressure chamber 25. Fluid flow into the pressure chamber 25 increases the fluid pressure therein, and creates a backpressure on the seal 44 and disc 40 biasing the disc 40 toward the annular rib 43. This increases the amount of energy required to deflect the disc 40 and as a result, increases the effective damping force of the damper 10. Current supplied to the coil 71 is controllable in a manner that selectively draws the wedge armature 69 against the stop 51 to selectively restrict the amount of fluid that is expelled from the longitudinal passage 54 to the compression chamber 18. This provides a means of selectively setting the damping characteristic of the damper 10 to a desired and continuously variable level.

Figure 3:
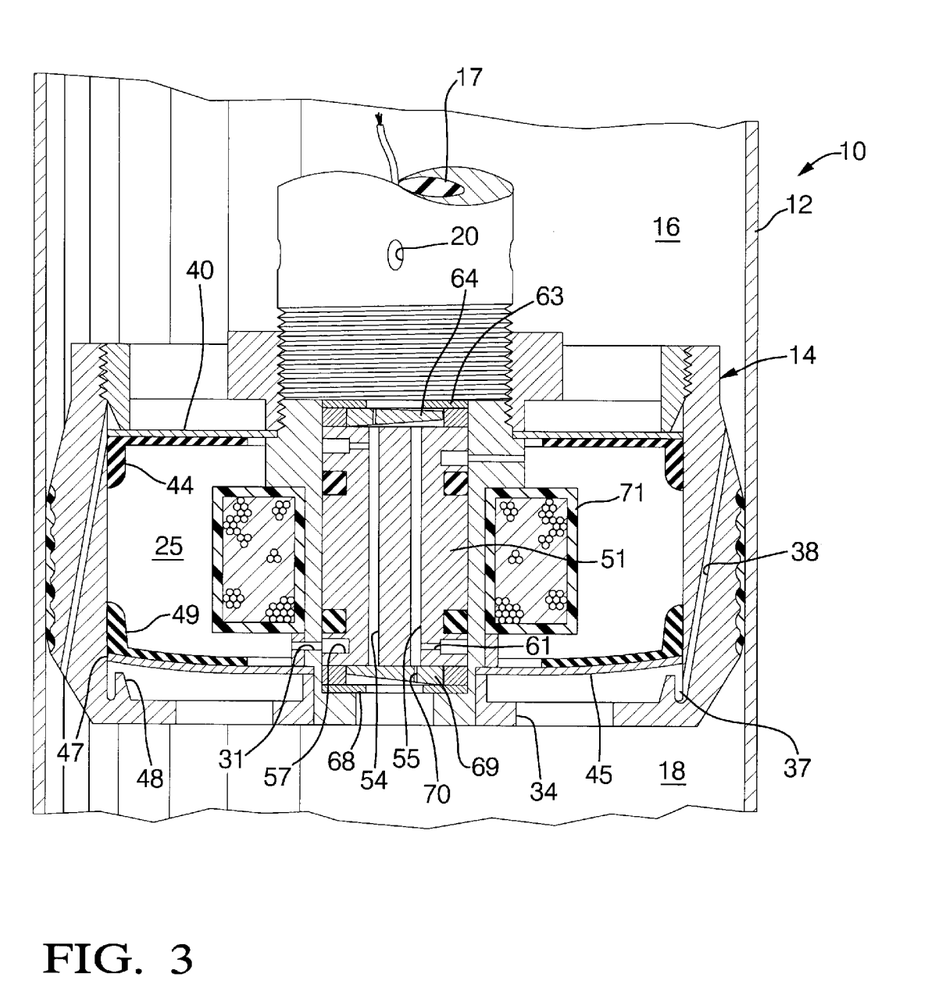
FIG. 3 is a fragmentary cross sectional illustration of the damper of FIG. 1 shown in compression operation.

When the piston assembly 14 moves in a compression direction within the tube 12, fluid is urged to flow from the compression chamber 18 to the extension chamber 16. A fluid force is induced through the openings 34 onto the damping disc 45 causing the outer perimeter 47 to deflect off the annular rib 48. This moves the seal 49 and opens the openings 34 to the annular cavity 37. A passage from the compression chamber 18 to the extension chamber 16 is established through annular cavity 37 and the openings 34, between the disc 45 and rib 48, and through the openings 38. Fluid flow into the pressure chamber 25 along the cylindrical extension 35 is inhibited by seal 49 in combination with the fluid pressure in pressure chamber 25. Fluid flow from pressure chamber 25 to extension chamber 16 is inhibited during compression operation by disc 40 and seal 44.

Fluid force established in compression chamber 18 as a pumping chamber is also transmitted through the plate 68 causing the wedge armature 69 to be forced against the pole piece 51. This closes the longitudinal passage 54 off from the compression chamber 18. The longitudinal passage 55 is opened to the compression chamber 18 through the metering orifice 70 of wedge armature 69. Fluid flow and pressure is transmitted through the metering orifice 70 into the longitudinal passage 55. When the coil 71 is not energized, fluid in longitudinal passage 55 is expelled past the wedge armature 64 through the plate 63, the axial opening 17 and transverse openings 20 into the extension chamber 16. Therefore, the damping characteristic of the damper 10 during compression travel is determined solely by the mechanical deflective characteristic of the disc 45 when the coil 71 is not energized.

When the coil 71 is energized, the wedge armature 64 is drawn toward the pole piece 51 as shown in FIG. 1. This prevents the expulsion of fluid from the longitudinal passage 55. Fluid flow is transferred through the plate 68, the metering orifice 70, the longitudinal passage 55, the opening 61, the annular channel 57 and opening 31 to the pressure chamber 25. Fluid flow into the pressure chamber 25 increases the fluid pressure therein, and creates a backpressure on the seal 49 and disc 45 increasing the amount of force necessary to deflect the disc 45 off rib 48 a given amount. By selectively controlling the supply of current to the coil 71, the pressure in pressure chamber 25 is variable to effect a desired damping rate of the damper 10.

The damping rate of the damper 10 is continuously variable in both extension and compression directed travel. The single coil 71 controls armatures 64 and 69 to effect a variable damping rate performance of the damping disks 40 and 45. The damping rate is always determined by the deflection characteristics of the discs 40 and 45 as changed by pressure in the pressure chamber 25. Packaging the control valve within the piston assembly 14 provides a design that is easier to package than valves that are carried external to the tube 12. Additionally, the use of pressure control to effect a variable damping rate with direct control input provided by the pumping chamber is desirable because the level of damping control provided is more precise than a variable orifice type device.

Figure 4:
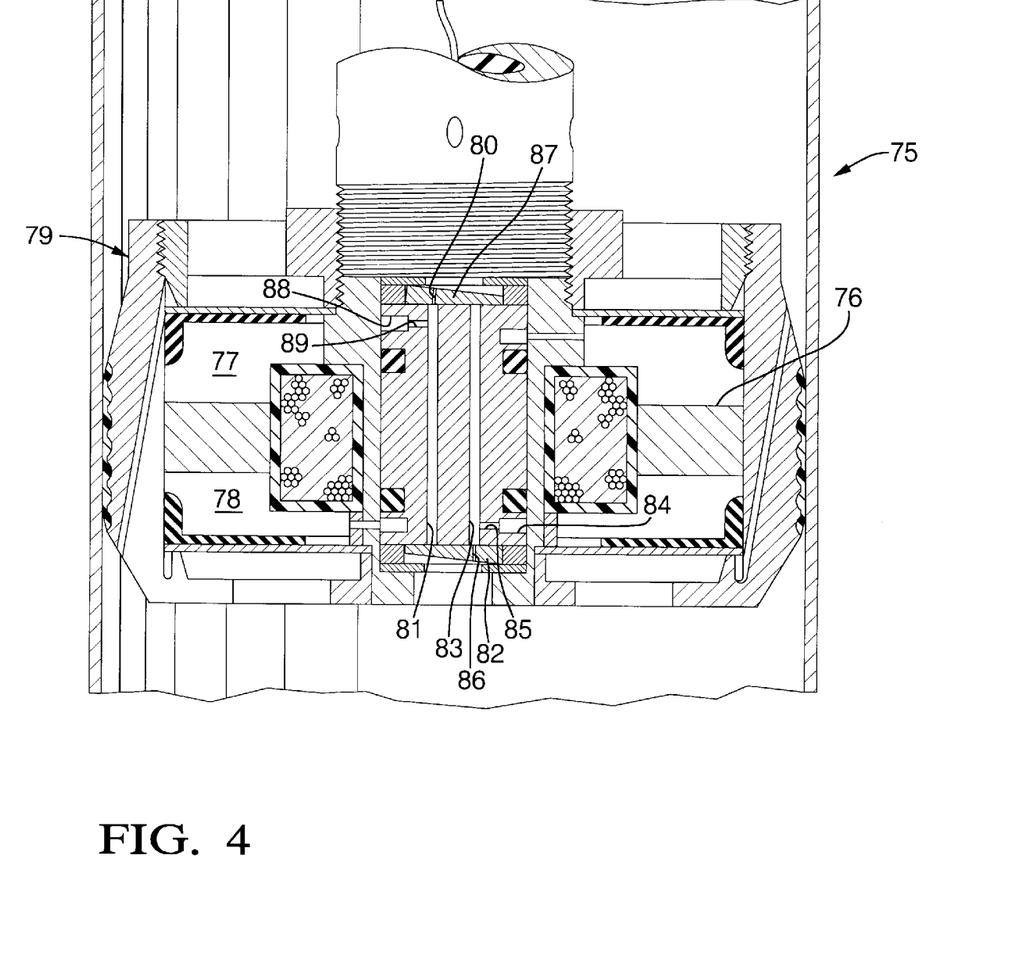
FIG. 4 is a fragmentary cross sectional illustration of a vehicle suspension damper according to an alternative embodiment .

Referring to FIG. 4, an additional embodiment of the present invention is illustrated. The damper 75 is substantially the same as the damper 10 of FIGS. 1–3 with the exception that a wall 76 separates out two pressure chambers 77 and 78 within the piston assembly 79. In this embodiment, the operation in compression and extension is completely isolated from each other. This prevents the backflow of control pressure from the pressure chamber 77 and 78 through the metering control orifice of the opposite armature providing an enhanced level of damping rate control, when necessary or preferred.

More specifically, during extension travel of the piston assembly 79, fluid flow supplied through the metering orifice 80 into the longitudinal passage 81 can either be expelled past the armature 82 or directed into the pressure chamber 77. The wall 76 prevents fluid flow and pressure transmission provided to the pressure chamber 77 from entering the longitudinal passage 83 through the openings 84 and 85 and exiting through the metering orifice 86. Similarly, during compression travel of the piston assembly 79, fluid flow supplied through the metering orifice 86 can either be expelled past the armature 87 or directed into the pressure chamber 78. The wall 76 prevents fluid flow and pressure transmission provided to the pressure chamber 78 from entering the longitudinal passage 81 through the openings 88 and 89 and exiting through the metering orifice 80.

I claim:

1. A damper comprising:

a tube;

a piston having at least one pressure chamber, being carried in the tube, separating the tube into extension and compression chambers, and being movable in an extension direction and a compression direction;

a bi-directional control valve carried by the piston and including:

a first annular disc carrying a first seal and separating the compression chamber from the extension chamber and being variably deflectable under fluid force to provide an opening between the compression chamber and the extension chamber;

a first passage extending through the piston between the pressure chamber and the extension chamber;

a first movable armature positioned in the first passage;

a second annular disc carrying a second seal and separating the extension chamber from the compression chamber and being variably deflectable under fluid force to provide an opening between the extension chamber and the compression chamber;

a second passage extending through the piston between the pressure chamber and the compression chamber;

a second movable armature positioned in the second passage;

a coil positioned near the first and second armatures and being operable to draw both the first and the second armatures to respectively close the first and the second passages; and a pole piece carried in the piston in a concentric position with both the first and the second annular discs, the pole piece having a substantially cylindrical body with a first longitudinal passage forming a part of the first passage and a second longitudinal passage forming a part of the second passage wherein when the coil is energized an electromagnetic force is communicated through the pole piece to draw both the first and second armatures toward the pole piece.

2. A damper comprising:

a tube;

a piston having at least one pressure chamber, being carried in the tube, separating the tube into extension and compression chambers, and being movable in an extension direction and a compression direction;

a bi-directional control valve carried by the piston and including:

a first annular disc carrying a first seal and separating the compression chamber from the extension chamber and being variably deflectable under fluid force to provide an opening between the compression chamber and the extension chamber;

a first passage extending through the piston between the pressure chamber and the extension chamber;

a first movable armature positioned in the first passage;

a second annular disc carrying a second seal and separating the extension chamber from the compression chamber and being variably deflectable under fluid force to provide an opening between the extension chamber and the compression chamber;

a second passage extending through the piston between the pressure chamber and the compression chamber;

a second movable armature positioned in the second passage;

a coil positioned near the first and second armatures and being operable to draw both the first and the second armatures to respectively close the first and the second passages; and a pole piece carried in the piston in a concentric position with both the first and the second annular discs, the pole piece having a substantially cylindrical body with a first longitudinal passage forming a part of the first passage and a second longitudinal passage forming a part of the second passage wherein when the coil is energized an electromagnetic force is communicated through the pole piece to draw both the first and second armatures toward the pole piece;

wherein the piston includes mating body elements that define the pressure chamber and include a first annular cavity within the piston normally separated off from the pressure chamber by the first annular disc with a plurality of openings extending through the piston from the compression chamber to the first annular cavity and including a second annular cavity within the piston normally separated off from the pressure chamber by the second annular disc with a plurality of openings extending through the piston between the extension chamber and the second annular cavity.

3. A damper according to claim 2 wherein a variable fluid pressure is established in the pressure chamber during an extension stroke of the piston by fluid flowing into the pressure chamber through the first passage and controllably expelling out of the pressure chamber past a second wedge armature and during a compression stroke of the piston by fluid flowing into the pressure chamber through the second passage and controllably expelling out of the pressure chamber past a first wedge armature.

4. A suspension damper operable in both extension and compression strokes at continuously variable damping rates comprising:

a cylindrical tube;

a piston slidably carried in the tube, separating the tube into extension and compression chambers, and being movable in an extension direction and a compression direction during a corresponding extension and compression stroke of the damper wherein the piston is formed by two mating body elements defining an annular pressure chamber and carrying a band of low friction material that engages the cylindrical tube providing a fluid seal between the extension and compression chambers;

a piston rod rigidly attached to the piston and extending through the extension chamber and having an axial opening and a number of transverse openings intersecting the axial opening and being open to the extension chamber;

a bi-directional control valve carried by the piston and including:

a first annular disc carrying a first seal and separating the compression chamber from the extension chamber and being variably deflectable under fluid force into the annular pressure chamber to provide an opening from the extension chamber to the compression chamber during extension strokes and being securely closed at all times during compression strokes;

a first passage extending through the piston between the pressure chamber and the extension chamber and the pressure chamber and the compression chamber;

a first movable armature positioned in the first passage and having a first metering orifice forming a segment of the first passage;

a second annular disc carrying a second seal and separating the extension chamber from the compression chamber and being variably deflectable under fluid force into the annular pressure chamber to provide an opening from the compression chamber to the extension chamber during compression strokes and being securely closed at all times during extension strokes;

a second passage extending through the piston between the pressure chamber and the compression chamber and the pressure chamber and the extension chamber;

a second movable armature positioned in the second passage and having a second metering orifice forming a segment of the second passage; and a coil positioned in the piston near the first and second armatures and being operable to draw both the first and the second armatures to respectively close the first passage off from the compression chamber and the second passage off from the extension chamber.

5. A suspension damper according to claim 4 further comprising a pole piece carried in the piston in a concentric position with both the first and the second annular discs, the pole piece having a substantially cylindrical body with a first longitudinal passage forming a part of the first passage and a second longitudinal passage forming a part of the second passage wherein when the coil is energized an electromagnetic force is communicated through the pole piece to draw both the first and second armatures toward the pole piece.

6. A suspension damper operable in both extension and compression strokes at continuously variable damping rates comprising:

a cylindrical tube;

a piston slidably carried in the tube, separating the tube into extension and compression chambers, and being movable in an extension direction and a compression direction during a corresponding extension and compression strokes of the damper wherein the piston is formed by two mating body elements defining an annular pressure chamber and carrying a band of low friction material that engages the cylindrical tube providing a fluid seal between the extension and compression chambers wherein the mating body elements include a first body element that has a first annular plate with a first annular rib and a plurality of main openings, and a first cylindrical extension formed with the first annular plate having a central opening that is open to the compression chamber with a first cross opening intersecting a first longitudinal passage and a second cross opening intersecting a second longitudinal passage and wherein the mating body elements include a second body element having a second annular plate engaging the first cylindrical extension with a plurality of main openings extending through the second annular plate and, the second body element having a second cylindrical extension engaging the first annular plate;

a piston rod rigidly attached to the piston and extending through the extension chamber and having an axial opening to the central opening and a number of transverse openings intersecting the axial opening and being open to the extension chamber;

a bi-directional control valve carried by the piston and including:

a pole piece positioned in the central opening and having first and second longitudinal passages with a first armature that is movable to close the second longitudinal passage off from the extension chamber and having a first metering orifice that is movable into registry with the first longitudinal passage, and with a second armature that is movable to close the first longitudinal passage off from the compression chamber and having a second metering orifice that is movable into registry with the second longitudinal passage:

a first annular disc carrying a first seal and normally engaging the first annular rib to separate the extension chamber from the compression chamber and being variably deflectable under fluid force to provide an opening from the extension chamber to the compression chamber during extension strokes and continuously providing fluid separation between the extension chamber and the pressure chamber and being securely closed at all times during compression strokes;

a second annular disc carrying a second seal and normally engaging a second annular rib to separate the compression chamber from the extension chamber and being variably deflectable under fluid force to provide an opening from the compression chamber to the extension chamber during compression strokes and continuously providing fluid separation between the compression chamber and the pressure chamber and being securely closed at all times during extension strokes; and a coil positioned in the piston near the first and second armatures and being operable to draw both the first and the second armatures toward the pole piece to respectively close the first passage off from the compression chamber and the second passage off from the extension chamber wherein fluid pressure in the pressure chamber is varied by drawing the armatures toward the pole piece to vary the damping rate.

7. A suspension damper according to claim 6 further comprising a wall in the piston separating the pressure chamber into a first chamber adjacent the first annular disc and a second chamber adjacent the second annular disc.

* * * * *